US012558847B1

(12) United States Patent
Bartholomew, Jr.

(10) Patent No.: US 12,558,847 B1
(45) Date of Patent: Feb. 24, 2026

(54) METHOD FOR DEVELOPING PERSONALLY FITTING CUSTOM ACCESSORIES

(71) Applicant: William Michael Bartholomew, Jr., Moore, OK (US)

(72) Inventor: William Michael Bartholomew, Jr., Moore, OK (US)

( * ) Notice: Subject to any disclaimer, the term of this patent is extended or adjusted under 35 U.S.C. 154(b) by 227 days.

(21) Appl. No.: 18/117,327

(22) Filed: Mar. 3, 2023

Related U.S. Application Data

(60) Provisional application No. 63/268,811, filed on Mar. 3, 2022.

(51) Int. Cl.
   B29C 64/386 (2017.01)
   B33Y 50/00 (2015.01)
(52) U.S. Cl.
   CPC ............ B29C 64/386 (2017.08); B33Y 50/00 (2014.12)
(58) Field of Classification Search
   CPC ...................................................... F41C 23/10
   See application file for complete search history.

(56) References Cited

U.S. PATENT DOCUMENTS

| | | | | |
|---|---|---|---|---|
| 5,353,474 | A * | 10/1994 | Good | B25G 1/102 |
| | | | | 173/171 |
| 2008/0263829 | A1 * | 10/2008 | Diasio | A63B 60/06 |
| | | | | 264/293 |

| | | | | |
|---|---|---|---|---|
| 2013/0340312 | A1 * | 12/2013 | Fulton | F41C 23/10 |
| | | | | 42/73 |
| 2016/0341517 | A1 * | 11/2016 | Williams | B33Y 50/00 |

FOREIGN PATENT DOCUMENTS

| | | | | |
|---|---|---|---|---|
| DE | 102013202187 A1 * | 8/2014 | | B25F 5/02 |
| GB | 2169541 A * | 7/1986 | | A61F 5/01 |

* cited by examiner

*Primary Examiner* — JaMel M Nelson
*Assistant Examiner* — Virak Nguon
(74) *Attorney, Agent, or Firm* — Plager Schack LLP; Mark H. Plager; Stephen Hallberg

(57) ABSTRACT

A method for developing personally fitting custom accessories is disclosed. The method for developing personally fitting custom accessories provides a way for a user to form a material in a personalized way to make a perfect fit. The perfect fit is achieved as a continuous form of contact between the user and an accessory, such as a hand grip. A mold is scanned in 3D so that a 3D model can be used to physical manufacture a personally fitting custom accessory or product. The method for developing personally fitting custom accessories also enables modification of a developed personally fitting custom accessory to provide enhance usability of the accessory (e.g., adding a mount to the top of a personally fitting custom hand grip, etc.). In this way, the method for developing personally fitting custom accessories establishes optimized stability, handling, control, and comfort for the end user.

11 Claims, 7 Drawing Sheets

100

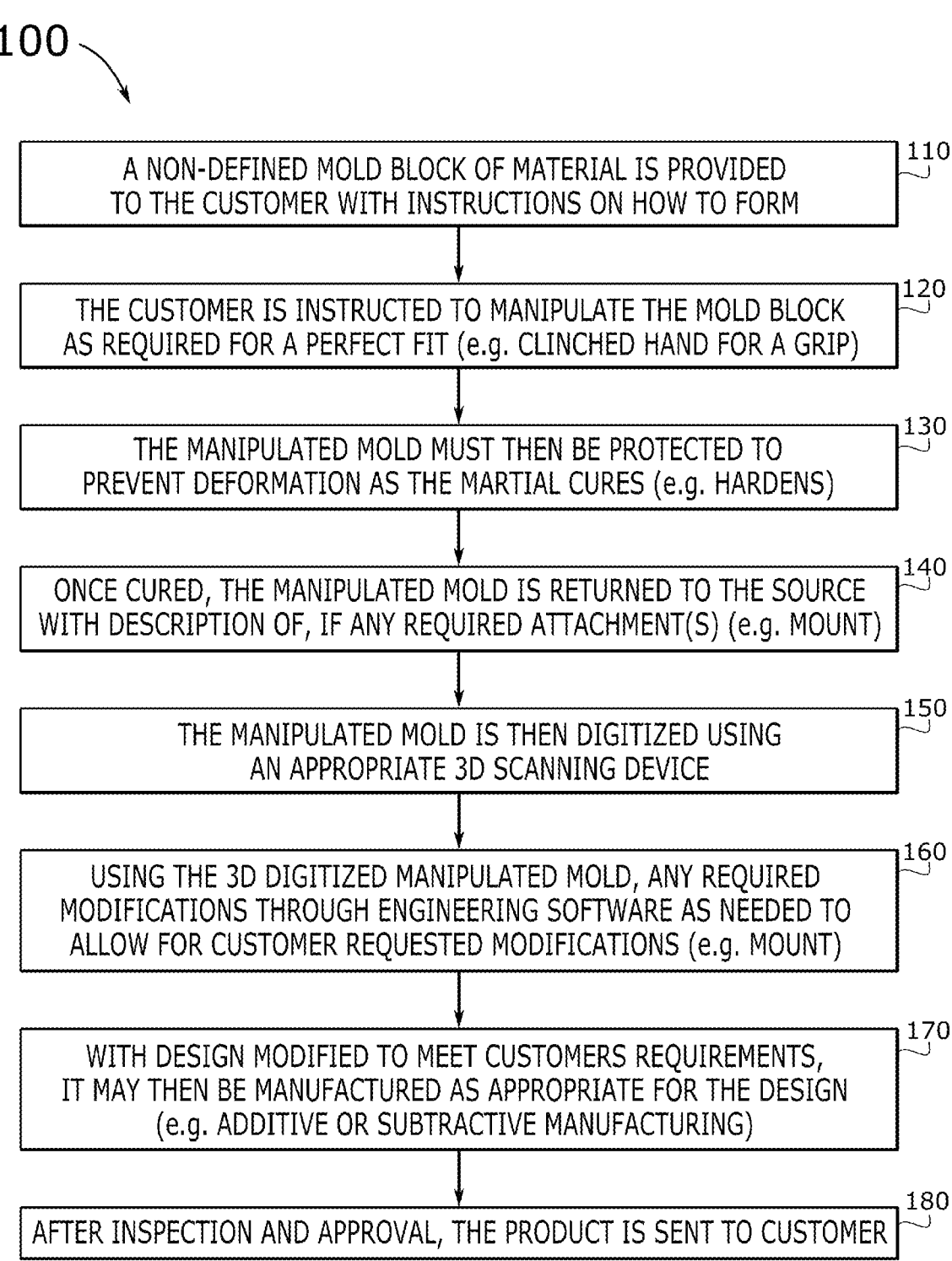

| | |
|---|---|
| A NON-DEFINED MOLD BLOCK OF MATERIAL IS PROVIDED TO THE CUSTOMER WITH INSTRUCTIONS ON HOW TO FORM | 110 |
| THE CUSTOMER IS INSTRUCTED TO MANIPULATE THE MOLD BLOCK AS REQUIRED FOR A PERFECT FIT (e.g. CLINCHED HAND FOR A GRIP) | 120 |
| THE MANIPULATED MOLD MUST THEN BE PROTECTED TO PREVENT DEFORMATION AS THE MARTIAL CURES (e.g. HARDENS) | 130 |
| ONCE CURED, THE MANIPULATED MOLD IS RETURNED TO THE SOURCE WITH DESCRIPTION OF, IF ANY REQUIRED ATTACHMENT(S) (e.g. MOUNT) | 140 |
| THE MANIPULATED MOLD IS THEN DIGITIZED USING AN APPROPRIATE 3D SCANNING DEVICE | 150 |
| USING THE 3D DIGITIZED MANIPULATED MOLD, ANY REQUIRED MODIFICATIONS THROUGH ENGINEERING SOFTWARE AS NEEDED TO ALLOW FOR CUSTOMER REQUESTED MODIFICATIONS (e.g. MOUNT) | 160 |
| WITH DESIGN MODIFIED TO MEET CUSTOMERS REQUIREMENTS, IT MAY THEN BE MANUFACTURED AS APPROPRIATE FOR THE DESIGN (e.g. ADDITIVE OR SUBTRACTIVE MANUFACTURING) | 170 |
| AFTER INSPECTION AND APPROVAL, THE PRODUCT IS SENT TO CUSTOMER | 180 |

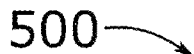
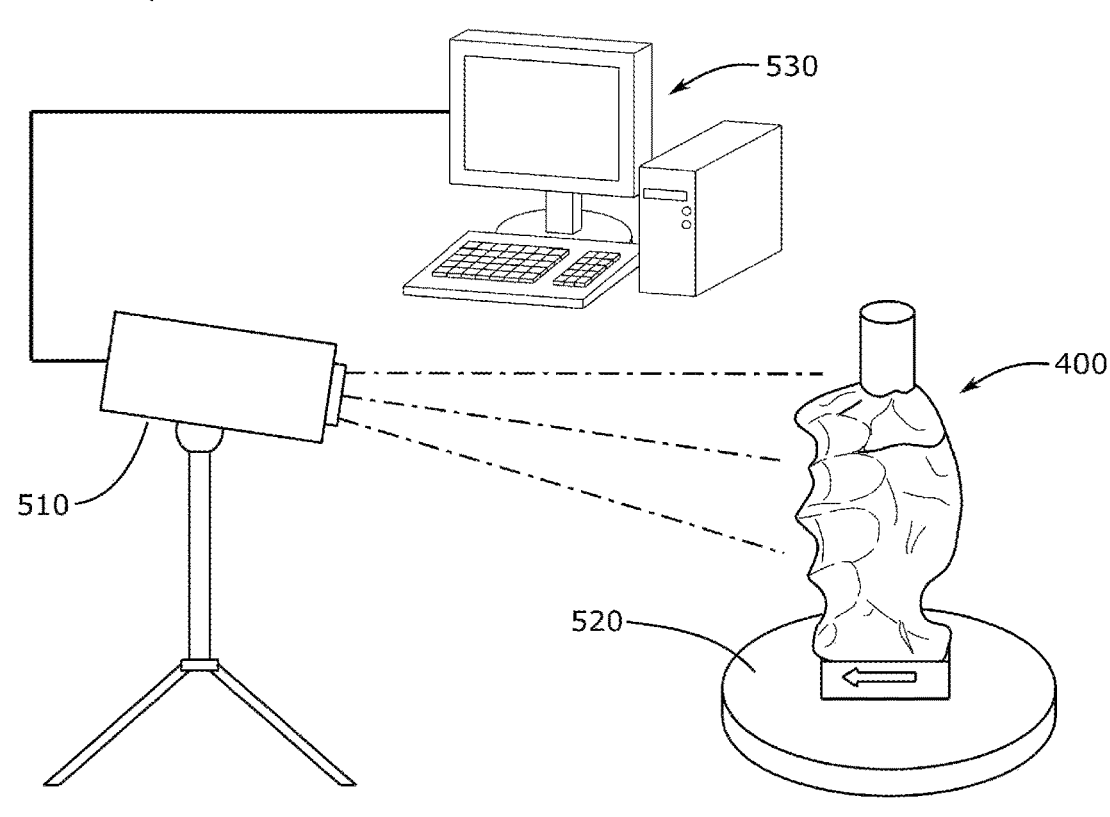
FIG. 5
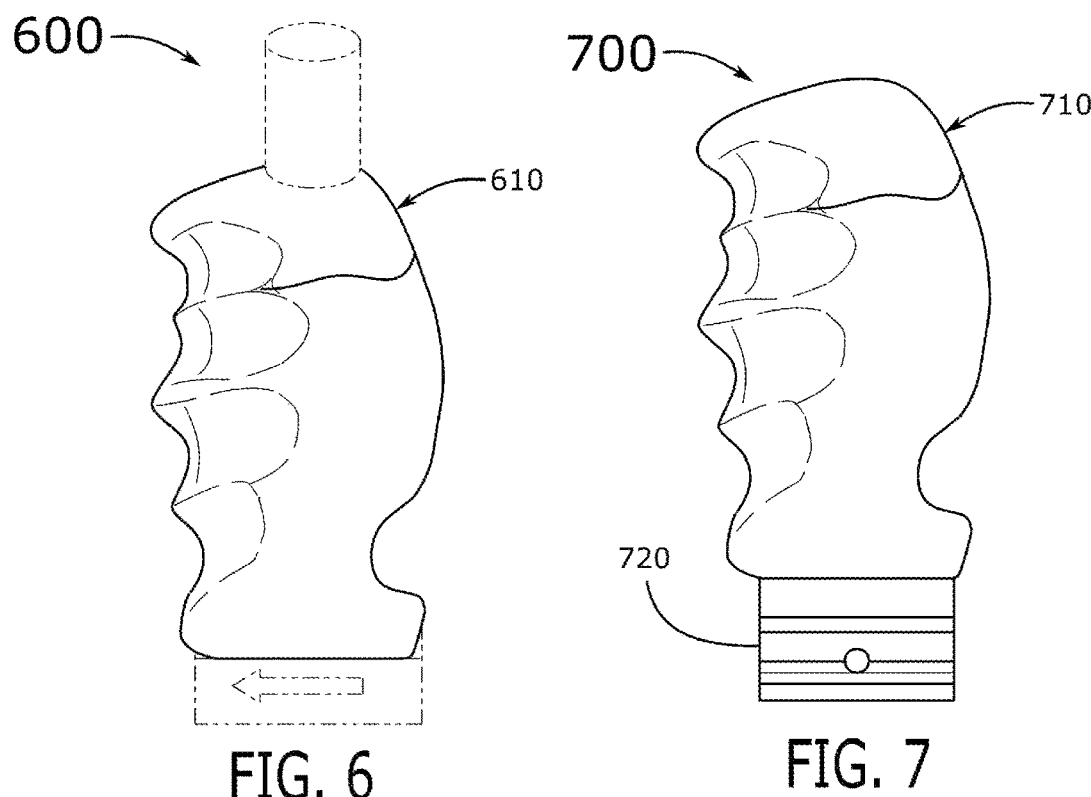
FIG. 6         FIG. 7

800

900

1000

1100

METHOD FOR DEVELOPING PERSONALLY FITTING CUSTOM ACCESSORIES

CLAIM OF BENEFIT TO PRIOR APPLICATION

This application claims benefit to U.S. Provisional Patent Application 63/268,811, entitled "METHOD OF MAKING CUSTOM ACCESSORIES," filed Mar. 3, 2022. The U.S. Provisional Patent Application 63/268,811 is incorporated herein by reference.

BACKGROUND

Embodiments of the invention described in this specification relate generally to creating accessories and products, and more particularly, to a method for developing personally fitting custom accessories.

Products and accessory products, such as grips, handles, and other products or accessories, are typically created in a generalized manner. Since these products and accessories are not designed for any specific user, the outcome is that those products and accessories tend to provide less than optimal function.

Furthermore, existing devices, products, accessories, etc., are generalized to a so-called average user and do not create optimal contact in a way the is personally consistent with any given user's needs. For example, a small hand of a user may not be able to sufficiently stabilize hold on a grip, or a user with bony hand may have different grip requirements than a person with a smoother hand, etc. Beyond grips, handles, and other hand products or accessories, the same problem exists with respect to accessories intended for other body parts. For instance, every person has a unique shape for the soles (bottoms) of their feet, yet shoe inserts are manufactured only to accommodate relative lengths of feet, rather than adjust for the unique contours of different feet.

Therefore, what is needed is a way to provide a continuous form of contact between the user and the product in order to ensure optimized stability, handling, control, and comfort when the user is engaged in using the product.

BRIEF DESCRIPTION

A novel method for developing personally fitting custom accessories is disclosed. In some embodiments, the method for developing personally fitting custom accessories provides a way for a user to form a material in a personalized way to make a perfect fit. In some embodiments, the perfect fit is achieved as a continuous form of contact between the user and an accessory, such as a hand grip (in which the contours of the user's hand wraps perfectly around the grip). A mold is scanned in three dimensions ("3D") so that a 3D model can be used to physical manufacture a personally fitting custom accessory or product. In some embodiments, the method for developing personally fitting custom accessories also enables modification of a developed personally fitting custom accessory to provide enhance usability of the accessory (e.g., adding a mount to the top of a personally fitting custom hand grip, etc.). In this way, the method for developing personally fitting custom accessories establishes optimized stability, handling, control, and comfort for the end user.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 1 conceptually illustrates a method for developing personally fitting custom accessories in some embodiments.

FIG. 5 conceptually illustrates a 3D scanning system that is used create a digital 3D model of the perfect fit mold in some embodiments.

FIG. 6 conceptually illustrates the digital 3D model created by scanning the perfect fit mold in some embodiments.

FIG. 7 conceptually illustrates a modified digital 3D model that is created by adding a digital 3D component to the digital 3D model in some embodiments.

DETAILED DESCRIPTION

Figures 2, 3, 4:
FIG. 2 conceptually illustrates an example of a malleable material mold block provided to a user in some embodiments.
FIG. 3 conceptually illustrates the user manipulating the malleable material mold block in some embodiments.
FIG. 4 conceptually illustrates a perfect fit mold that results from the user manipulating the malleable material mold in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Embodiments of a method for developing personally fitting custom accessories are disclosed. In some embodiments, the method for developing personally fitting custom accessories provides a way for a user to form a material in a personalized way to make a perfect fit (or "perfect fit mold"). In some embodiments, the perfect fit is achieved as a continuous form of contact between the user and an accessory, such as a hand grip (in which the contours of the user's hand wraps perfectly around the grip). In some embodiments, the perfect fit mold is scanned in three dimensions ("3D") so that a 3D model can be used to physical manufacture a personally fitting custom accessory or product. In some embodiments, the method for developing personally fitting custom accessories also enables modification of a developed personally fitting custom accessory to provide enhance usability of the accessory (e.g., adding a mount to the top of a personally fitting custom hand grip, etc.). In this way, the method for developing personally fitting custom accessories establishes optimized stability, handling, control, and comfort for the end user.

As stated above, products and accessory products, such as grips, handles, and other products or accessories, are typically created in a generalized manner. Since these products and accessories are not designed for any specific user, the outcome is that those products and accessories tend to provide less than optimal function. Furthermore, existing devices, products, accessories, etc., are generalized to a so-called average user and do not create optimal contact in a way the is personally consistent with any given user's needs. For example, a small hand of a user may not be able to sufficiently stabilize hold on a grip, or a user with bony hand may have different grip requirements than a person with a smoother hand, etc. Beyond grips, handles, and other hand products or accessories, the same problem exists with respect to accessories intended for other body parts. For instance, every person has a unique shape for the soles (bottoms) of their feet, yet shoe inserts are manufactured only to accommodate relative lengths of feet, rather than adjust for the unique contours of different feet. Embodiments of the method for developing personally fitting custom accessories described in this specification solve such problems by providing a way for personal users to provide a mold of their personal, custom hand grip, foot shape, or other body part counter shape for use in developing and manufacturing a personalized, customized product or accessory for each particular user. The method for developing personally fitting custom accessories involves the use of a pliable medium or material (e.g., clay), which the personal user manipulates until a perfect fit is achieved, and also involves modeling the perfect fitting formed medium in three dimensions, along with possible manipulation of the 3D model to provide attachments and modifications to the personalized, customized product/accessory (such as adding mounting points, or embedding devices or other items within or extruding out of the mold, etc.). Overall, the 3D model (whether modified or not) is then used in the development or manufacture of the personalized/customized product or accessory for the user. In this way, a user can obtain a custom product/accessory that is perfectly optimized to fit the user.

Embodiments of the method for developing personally fitting custom accessories described in this specification differ from and improve upon currently existing options. In particular, existing mechanisms for product creation involve generalized (one-size-fits-all) approaches, or involve variations, such as providing for different sizes (small, medium, large, extra-large, etc.). However, none of the existing mechanisms provide truly customized, personalized creation of products/accessories according to the actual physical contours, strength, size, physical idiosyncrasies, etc., of each individual person who purchase or use the products/accessories. Consequently, there is almost always a better fit that could be achieved for each given user.

However, the method for developing personally fitting custom accessories described in this specification provides a way to create unique products and accessories that are formed specifically to each individual user and, therefore, are created to provide a fit that is completely optimized for the user. Furthermore the method for developing personally fitting custom accessories described in this specification allows for modification of the perfect fit form to enable attachments and connections to other existing devices, tools, products, etc. For instance, modifying a perfect fit form of a hand grip that perfectly conforms to the contours of a user's hand, but which itself is modified to add a mounting point so that the user can attach the personalized, perfectly fitting hand grip, to a tool, a device, or another product. In this way, the method for developing personally fitting custom accessories overcomes the limitations of the existing approaches to creating products and accessories. In this way, the method for developing personally fitting custom accessories described in this specification is able to provide customized, personalized, perfectly fitting products and accessories that are optimized in stability, handling, control, and/or comfort for the user.

The method for developing personally fitting custom accessories of the present disclosure may be comprised of the following steps and elements. This list of possible constituent steps and elements is intended to be exemplary only and it is not intended that this list be used to limit the method for developing personally fitting custom accessories of the present application to just these steps or elements. Persons having ordinary skill in the art relevant to the present disclosure may understand there to be equivalent steps or elements that may be substituted within the present disclosure without changing the essential function or operation of the method for developing personally fitting custom accessories.

1. Providing a personal user (e.g., a customer) with a malleable medium (e.g., a moldable, pliable, workable material, such as clay) and instructions so the personal user may manipulate and work the medium into a personally fitting custom accessory (e.g., a hand grip that is fit for use by the personal user, shoe inserts that fit to the bottom of personal user's feet, etc.). Specifically, the personal user works the pliable medium until the custom accessory achieves a form that is a perfect fit for the personal user (e.g., as a hand grip that perfectly fits the contours of the personal user's hand when wrapped around or clinching the hand grip, as shoe inserts that perfectly fit the contours of the bottom of the personal user's feet, etc.).

2. Hardening (or curing) the medium (of the currently formed personally fitting custom accessory), by the personal user, and protecting it while hardening to prevent deformation. Hardening is performed by the personal user in the manner suitable for the medium (e.g., air-dry, oven-dry, sun-dry, hot air blow dryer, etc.).

3. Providing, to an attachment and modification user, the hardened personally fitting custom accessory and a description of any attachments the personal user requires for the personally fitting custom accessory (e.g., adding a mount to the top of a personally fitting custom hand grip, embedding pressure sensors into the personally fitting custom shoe inserts, etc.).

4. Digitally scanning in three dimensions ("3D scanning") the hardened personally fitting custom accessory, by the attachment and modification user, to create a digital 3D model of the personally fitting custom accessory (hereinafter referred to as either the "digital personally fitting custom accessory 3D model" or the "digital perfect fit 3D model").

5. Modifying the digital personally fitting custom accessory 3D model, through engineering software operated by the attachment and modification user, according to the description of attachments required by the personal user for the personally fitting custom accessory (e.g., adding a 3D mount model to the top of a digital personally fitting custom hand grip 3D model, embedding 3D pressure sensor models into digital personally fitting custom shoe insert 3D models, etc.).

6. Developing and manufacturing the modified personally fitting custom accessory in a suitable manner (e.g., by 3D printer, additive/subtractive manufacturing, tool and die manufacturing, etc.) based on the digital personally fitting custom accessory 3D model as modified.

7. Providing the manufactured modified personally fitting custom accessory to the personal user.

The various elements of the method for developing personally fitting custom accessories of the present disclosure may be related in the following exemplary fashion. It is not intended to limit the scope or nature of the relationships between the various elements and the following examples are presented as illustrative examples only. The user needs a simple method to provide their exact form (e.g., clinched hand for a grip) for product development. Step 1 allows the user to use a mold using a medium to provide that exact form, which they can manipulate as required for the perfect fit. That medium must then be protected to prevent deformation; step 2 ensures the medium is protected by hardening (process specific to the medium, for example an air-dry clay will rest in the open until hardened). Once the medium is protected, step 3 then allows the mold to be digitized by an appropriate 3D scanning device (such as a structured light scanner). The digitized design now allows for step 4 any required modification through engineering software as required by the customer (e.g. a grip will need to have a method to attach it to the intended item). Once the design has been modified to meet customer requirements, it may then be developed by step 5 as appropriate (e.g. addative or subtractive manufacturing).

The method for developing personally fitting custom accessories of the present disclosure generally works by following the steps above in order to provide a precise fit/form (e.g., clinched hand for a grip), optionally modify it for attachments, and create/manufacture a resultant product/accessory that is fully personalized with a perfect fit for the user. Step 1 allows the user to use a mold using a medium to provide that exact form, which they can manipulate as required for the perfect fit. That medium must then be protected to prevent deformation; step 2 ensures the medium is protected by hardening (process specific to the medium, for example an air-dry clay will rest in the open until hardened). Once the medium is protected, step 3 then allows the mold to be digitized by an appropriate 3D scanning device (such as a structured light scanner). The digitized design now allows for step 4 any required modification through engineering software as required by the customer (e.g., a grip will need to have a method to attach it to the intended item). Once the design has been modified to meet customer requirements, it may then be developed by step 5 as appropriate (e.g., additive or subtractive manufacturing). This method, with all steps working together in order, will result in custom products designed and manufactured to match the specific user form precisely.

To make the method for developing personally fitting custom accessories of the present disclosure, a person would identify one or more malleable material(s) which could be provided to users (e.g., customers) and would also need to prepare instructions explaining to those users how to manipulate the material to form the 'perfect fit' that precisely fits to their personal body part and characteristics. The instructions would also need to explain how to cure or harden the material, which varies for each different type of material. For instance, there may be a material which can be hardened by air-drying, while a different material requires heat to be applied for hardening. The instructions would also need to explain or suggest ways to protect the material as formed (i.e., before curing/hardening is complete) to prevent deformation of the perfect fit that has been formed. The instructions would need to direct the user to describe any modifications for potential attachments needed for the resultant product or accessory of the perfect fit mold. The instructions would also need to direct the user to send the perfect fit mold (and curing/hardening is complete) to another party (typically the person or an entity which provided the malleable material and instructions to the user) for 3D scanning and (ultimately) manufacture or creation of the resultant perfectly fitting product or accessory. Furthermore, the person would need to acquire use of a 3D scanner device (such as a structured light scanner), whereby the person (or other personnel employed by the person) can perform 3D scanning of the perfect fit mold sent by the user. The 3D scanning would result in an accurate, digital 3D model of the perfect fit mold. Then, the person (or other personnel, such as an engineer or other, employed by the person) would determine whether the user has provided additional instructions for making modifications for attachment to the perfect fit mold. If the user has provided additional instructions, the modifications and/or additional instructions would be carried out in a software application that is suitable for manipulating digital 3D models, such as engineering software, 3D model software, etc. After the modifications are made in the software, a modified digital 3D model can be used to manufacture/create the resultant product or accessory. As such, the person would also need to provide (or acquire use of) a 3D printer, a Computer Numerical Control (CNC) machine, or another type of creation/manufacturing device to use in either additive or subtractive model-based manufacturing to create the resultant product/accessory of the perfect fit mold (with any such modifications made to the digital 3D model).

In some cases, in addition to implementing the modifications and/or additional requirements in the digital 3D model of the perfect fit mold, the modifications or other additional requirements described by the user may involve real world actions to complete (that is, not only changes to the digital 3D model). For example, the user may have included instructions to embed sensor devices in a hand grip or shoe insert which would allow certain measurements to be captured (e.g., pressure of foot while walking, jogging, running, etc., or strength of hand squeezing a perfectly fitting hand grip, etc.). Accordingly, the person would use the software to lay out the positioning of such sensors within the digital 3D model of the perfect fit mold. However, depending on the means of manufacture (e.g., 3D printer, CNC machine, or other), the person may need to acquire (rather than create) the applicable devices (e.g., microchip sensor devices or other such devices, items, etc.). The person may simply choose to offer options in which such devices or other items (which are generally not suited for the person him or herself to create) are stored in inventory and ready to be added/embedded during creation of the resultant product/accessory. Alternatively, the person may have established other means of acquiring such devices or other items prior to creation/manufacture of the resultant product/accessory of the perfect fit mold.

With the aforementioned details in mind, the following descriptions demonstrate the method for developing personally fitting custom accessories by way of several conceptual illustrates at each step. By way of a first example, FIG. 1 conceptually illustrates a method for developing personally fitting custom accessories 100 in some embodiments. As shown in this figure, the method for developing personally fitting custom accessories 100 starts by a source entity providing a non-defined mold block to material to a customer with instructions on how to form the mold (at 110).

Turning to FIG. 2, an example of a malleable material mold block 200 is shown as provided to a user (the customer). As shown in this figure, the malleable material mold block 200 includes the raw material 210, a support stand 220, and freshness packaging 230. The customer will form the perfect fit mold by working the raw material 210, which is provided around the support stand 220 and within freshness packaging 230 to prevent drying out before the customer can manipulate the raw material 210.

Turning back to FIG. 1, the method for developing personally fitting custom accessories 100 proceeds to the next step in which customer is instructed to manipulate the mold block and work it as much as needed to obtain a perfect fit mold (at 120). For example, working the material by the customer clinching his or her hand around the material mold block to form a grip that perfectly fits his or her hand. This is demonstrated and described next, by reference to FIG. 3.

Specifically, FIG. 3 conceptually illustrates the user manipulating the malleable material mold block 300. As shown, the raw material 210 is positioned around the support stand 220 while the customer wraps a grip hand 310 around the raw material 210. This figure also demonstrates the usefulness of having the raw material 210 attached to and surrounding the support stand 220, since the customer can easily choose a different orientation for making the grip. Specifically, the customer has turned the support stand 220 upside down to manipulate the raw material 210, which allow for another component to be added to the resultant product (if needed).

Referring again to FIG. 1, after manipulating the raw material 210 of the mold block to form a perfect fit mold (for their hand), the method for developing personally fitting custom accessories 100 proceeds to the next step at which the customer cures (or hardens) the perfect fit mold (in a manner directed in the instructions) and also protects the perfect fit mold from deformation as the material of the perfect fit mold cures (at 130).

By way of example, FIG. 4 conceptually illustrates a perspective view of the hardened perfect fit mold 400 after curing is complete and the raw material 210 is hardened ("hardened raw material 410").

Again returning to FIG. 1, once cured, the hardened perfect fit mold 400 is returned (sent, manually delivered, or otherwise provided) to the source entity with description of any attachments, devices, or other items to attach to the resultant product (at 140). For instance, the customer may indicate that a mount should be attached to a top or bottom of the resultant product. The method for developing personally fitting custom accessories 100 continues forward to the next step after the hardened perfect fit mold 400 is received at the source entity. At this point, the source entity uses a 3D scanning system to digitally scan the hardened perfect fit mold 400 and generate a digital perfect fit 3D model (at 150). An example of a 3D scanning system is described next, by reference to FIG. 5, while an example of a digital 3D model (that is created by the 3D scanning system) is described further below, by reference to FIG. 6.

Specifically, FIG. 5 conceptually illustrates a 3D scanning system 500 that is used create a digital 3D model of the perfect fit mold (referred to as the "digital perfect fit 3D model"). As shown in this figure, the 3D scanning system 500 comprises a 3D scanning device 510, a stand 520 on which to place the hardened perfect fit mold 400 for 3D scanning, and a computing device with engineering software 530 that is communicably connected to the 3D scanning device and is configured for working with digital 3D models. Notably, the 3D scanning device 510 may be a 3D camera or a structured light scanner. Turning to FIG. 6, a perspective view of a digital 3D model 600 is shown. The digital 3D model 600 comprises the digital perfect fit 3D model 610, as created by the 3D scanning system 500 scanning the hardened perfect fit mold 400.

Returning again to FIG. 1, after the 3D scanning system 500 has created the digital perfect fit 3D model 610, the method for developing personally fitting custom accessories 100 proceeds to the next step at which the source entity may (optionally) use the engineering software on the computing device 530 to make digital modifications (at 160) to the digital perfect fit 3D model 610 as required by the customer (if any such requirement was made by the customer).

By way of example, FIG. 7 conceptually illustrates a modified digital 3D model 700 showing a modified digital 3D model 710 of the perfect fit mold with a mounting component 720 added digitally to the 3D model.

Turning back to FIG. 1, after modifications to the 3D model are made (if any), the method for developing personally fitting custom accessories 100 proceeds to the next step at which a personally fitting custom product is physically created (at 170). This is demonstrated and described next, by reference to FIG. 8.

Figure 8:
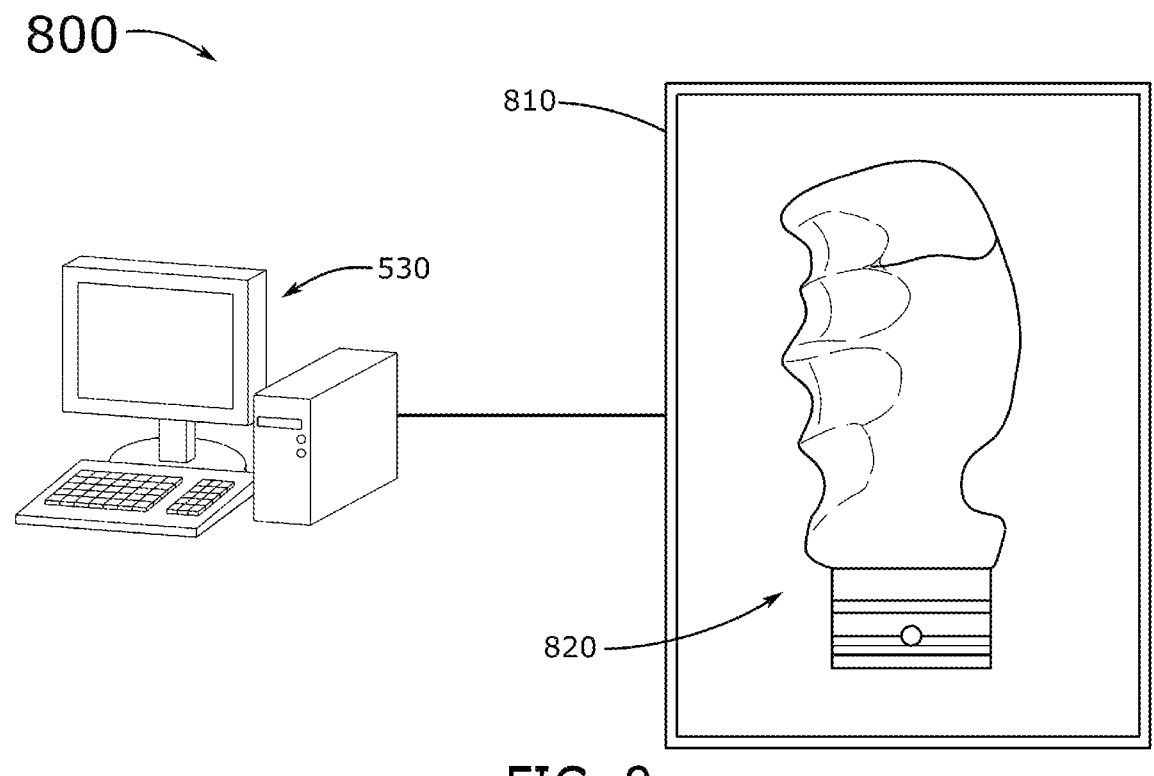
FIG. 8 conceptually illustrates creation of a resultant perfect fit product by a manufacturing device that is configured to use the modified digital 3D model to create the resultant perfect fit product in some embodiments.

Specifically, FIG. 8 conceptually illustrates creation of a resultant perfect fit product 800 by a manufacturing device 810. As shown in this figure, this is done by the computing device with the engineering software 530 transmitting the modified digital 3D model 710 to the manufacturing device 810 which physically creates a personally fitting custom grip product 820 that provides a perfect fit to the customer's hand. As noted above, the manufacturing device 810 may be a 3D printer, a CNC machine, or another such manufacturing device.

Returning again to FIG. 1, the method for developing personally fitting custom accessories 100 proceeds to the final step of sending the personally fitting custom grip product 820 to the customer. In some embodiments, inspection and approval by the source entity is performed prior to sending the personally fitting custom grip product 820 back to the customer. Once the customer receives the personally fitting custom grip product 820, they may use as desired. This is demonstrated and described next, by reference to FIG. 9.

Figure 9:
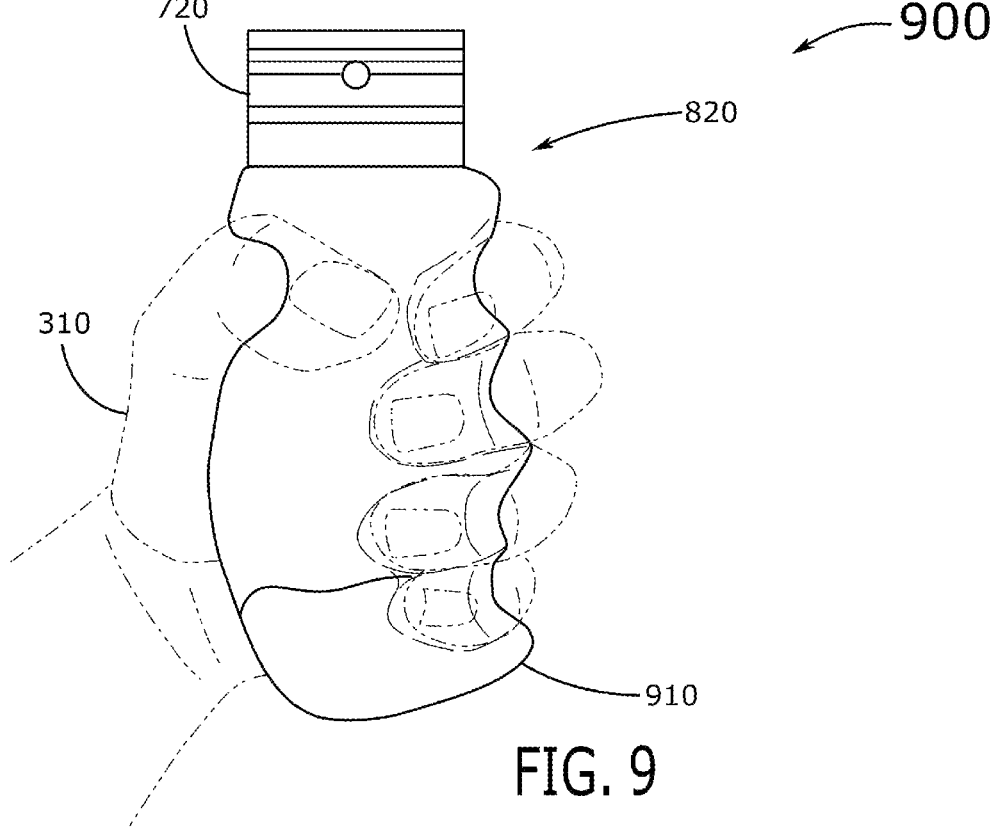
FIG. 9 conceptually illustrates a perspective view of the resultant perfect fit product in use by the user in some embodiments.

Specifically, FIG. 9 conceptually illustrates a perspective view of the resultant perfect fit product in use by the customer 900. As shown in this figure, the personally fitting custom grip product 820 with the mounting component 720 attached provides a personalized grip 910 for the customer, as shown by the grip hand 310 of the customer clinching the personally fitting custom grip product 820.

Figure 10:
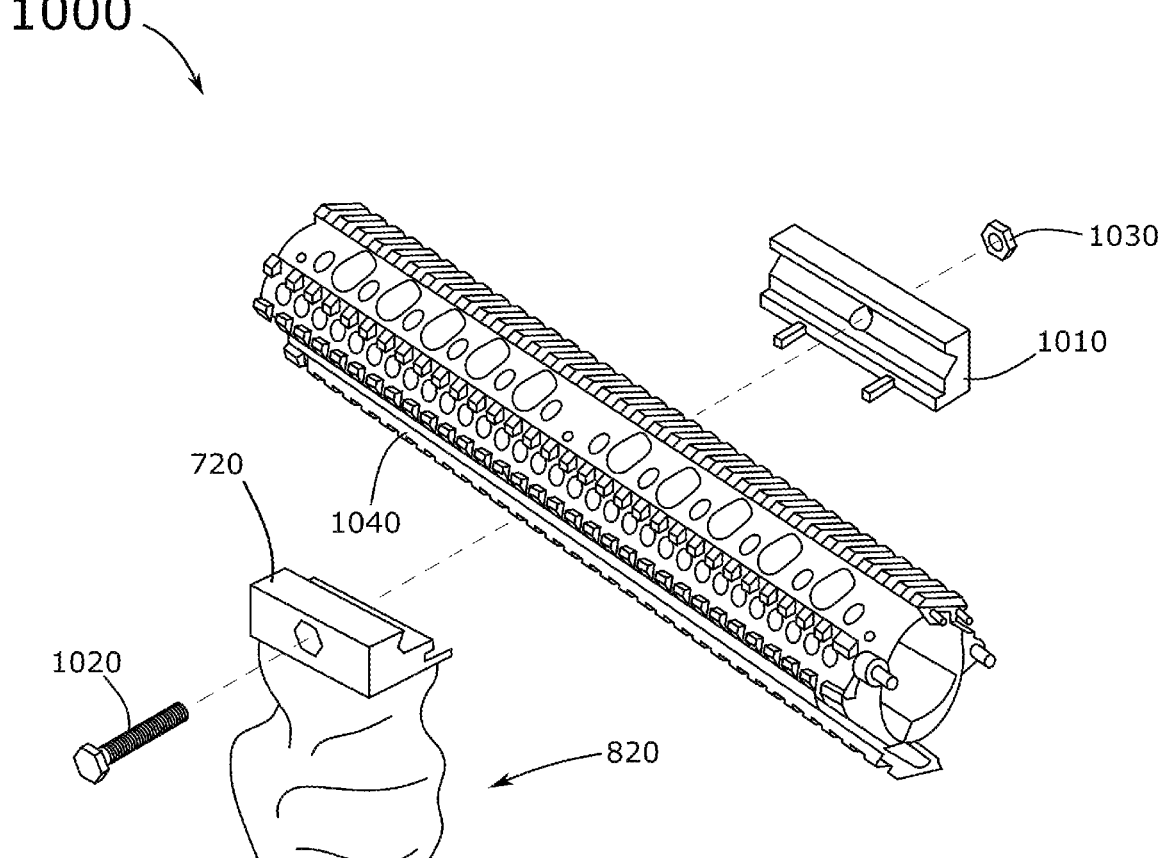
FIG. 10 conceptually illustrates a perspective view of a first exemplary mounting of a personally fitting custom hand grip in some embodiments.

By way of example, FIG. 10 conceptually illustrates a perspective view of a first exemplary mounting of a personally fitting custom hand grip 1000. As show in this figure, the first exemplary mounting of a personally fitting custom hand grip 1000 demonstrates how the personally fitting custom grip product 820 (which was modified during manufacturing to include the mounting component 720) is attached to a mounting platform 1040. Specifically, a bolt 1020 is inserted through an opening in the mounting component 720 positioned on the personally fitting custom grip product 820. The bolt 1020 is further inserted through another opening in a mounting component mate 1010. A nut 1030 screwed to the bolt 1020 fastens the mounting component 720 to the mounting component mate 1010, and secures the mounting platform 1040 between.

Figure 11:
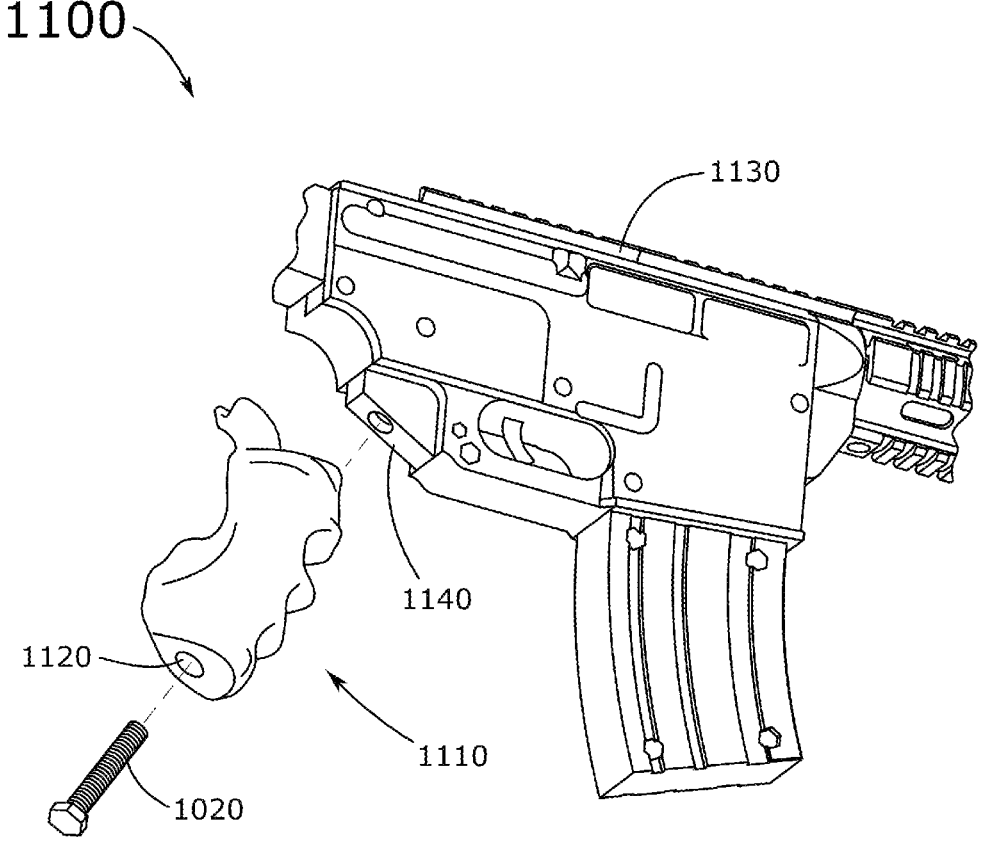
FIG. 11 conceptually illustrates a perspective view of a second exemplary mounting of a personally fitting custom hand grip in some embodiments.

Turning to another view, FIG. 11 conceptually illustrates a perspective view of a second exemplary mounting of a personally fitting custom hand grip 1100. As show in this figure, the second exemplary mounting of a personally fitting custom hand grip 1100 demonstrates how the an alternate personally fitting custom hand grip product 1110 is secured to a rifle 1130 at a handle mounting block 1140 by way the bolt 1020 inserting through a hole 1120 in the alternate personally fitting custom hand grip product 1110 and screwing into a hole in the handle mounting block 1140.

While the examples described above, by reference to FIGS. 1-11, demonstrate at least one preferred manner for creating and developing personally fitting customer products and accessories, it is noted that the method for developing personally fitting custom accessories can be used as is, or adapted in various ways, to create form fitting objects to anything that can be molded or scanned, or any products or devices that would benefit from precision form fitting applications.

The above-described embodiments of the invention are presented for purposes of illustration and not of limitation. Also, many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor, such as the processor of a computing device (e.g., the computing device with engineering software 530) or a processor of another device, such as a 3D printer or other computing device or electronic system, yet not limited to only these example, but inclusive of other devices with processors, control units, or other processing units including, without limitation, mobile computing devices, such as smartphones, hand-held computing devices, or tablet computing devices (referred to simply as a "mobile devices"), single board computers ("SBCs"), etc. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
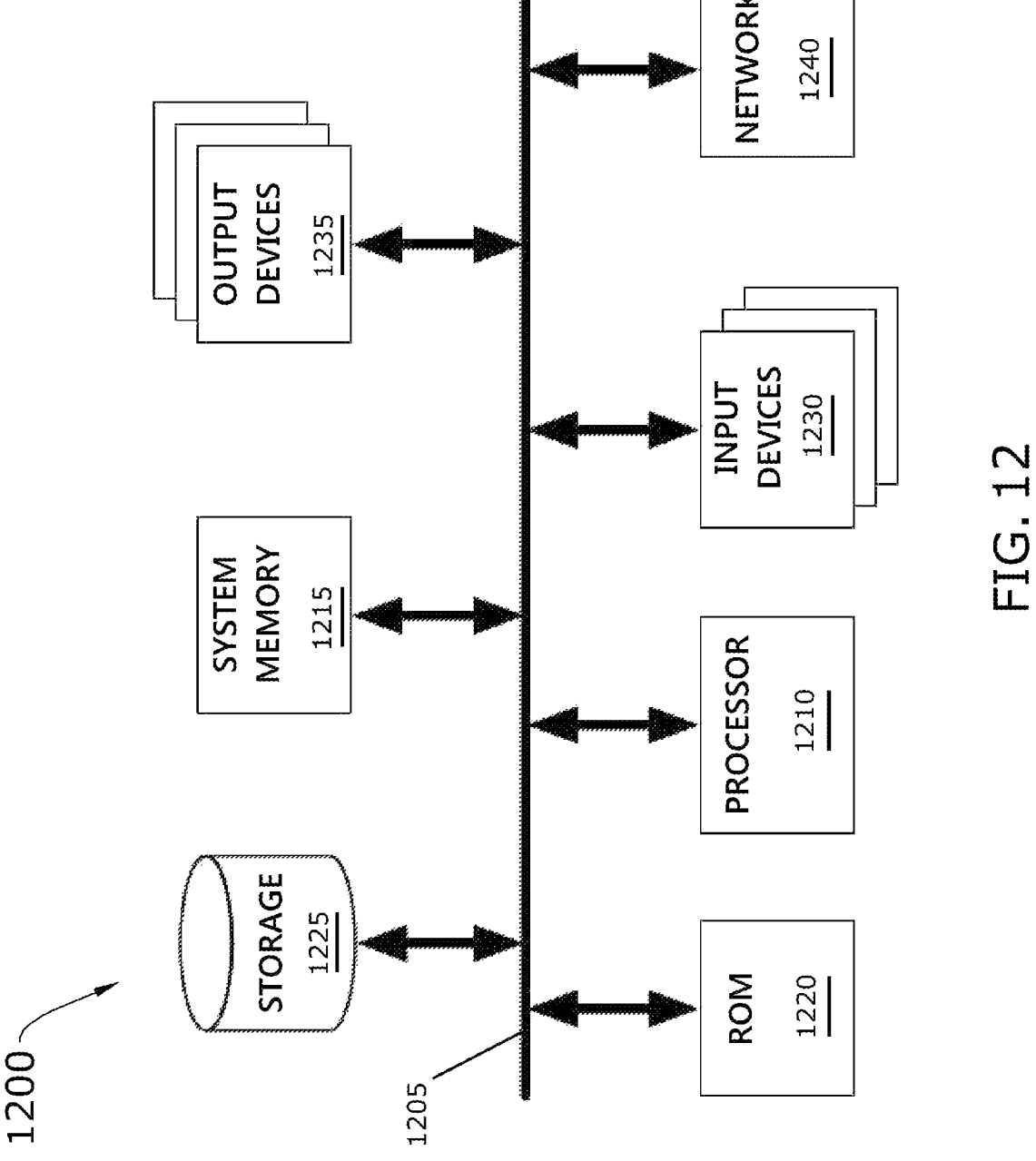
FIG. 12 conceptually illustrates an electronic system with which some embodiments of the invention are implemented.

FIG. 12 conceptually illustrates an electronic system 1200 with which some embodiments of the invention are implemented. The electronic system 1200 may be a computer, mobile device, tablet, phone, control device, or any other sort of electronic device. Such an electronic system includes various types of computer readable media and interfaces for various other types of computer readable media. Electronic system 1200 includes a bus 1205, processing unit(s) 1210, a system memory 1215, a read-only memory 1220, a permanent storage device 1225, input devices 1230, output devices 1235, and a network 1240.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1220, the system memory 1215, and the permanent storage device 1225. From these various memory units, the processing unit(s) 1210 retrieves instructions to execute and data to process in order to execute the processes of the invention. The processing unit(s) may be a single processor or a multi-core processor in different embodiments.

The read-only-memory (ROM) 1220 stores static data and instructions that are needed by the processing unit(s) 1210 and other modules of the electronic system. The permanent storage device 1225, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1225.

Other embodiments use a removable storage device (such as a floppy disk or a flash drive) as the permanent storage device 1225. Like the permanent storage device 1225, the system memory 1215 is a read-and-write memory device. However, unlike storage device 1225, the system memory 1215 is a volatile read-and-write memory, such as a random access memory. The system memory 1215 stores some of the instructions and data that the processor needs at runtime. In some embodiments, the invention's processes are stored in the system memory 1215, the permanent storage device 1225, and/or the read-only memory 1220. For example, the various memory units include instructions for processing appearance alterations of displayable characters in accordance with some embodiments. From these various memory units, the processing unit(s) 1210 retrieves instructions to execute and data to process in order to execute the processes of some embodiments.

The bus 1205 also connects to the input and output devices 1230 and 1235. The input devices enable the user to communicate information and select commands to the electronic system. The input devices 1230 include 3D scanning devices (such as structured light scanners) as well as 3D cameras, and more conventional input devices, such as alphanumeric keyboards and pointing devices (also called "cursor control devices"). The output devices 1235 physical create products and accessories from the 3D models generated and provided by the electronic system 1200. The output devices 1235 include 3D printers and CNC machines, as well as display devices (e.g., LCD and OLED displays, among others) on which the engineering software may visually output the 3D models for manipulation and/or review. Some embodiments include devices such as a touch-screen that functions as both input and output devices.

Finally, as shown in FIG. 12, bus 1205 also couples electronic system 1200 to a network 1240 through a network adapter (not shown). In this manner, the computer can be a part of a network of computers (such as a local area network ("LAN"), a wide area network ("WAN"), or an intranet), or a network of networks (such as the Internet). Any or all components of electronic system 1200 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 1 conceptually illustrates a method with multiple steps. In each step, the specific operations of the method may not be performed in the exact order shown and described. Specific operations may not be performed in one continuous series of operations, and different specific operations may be performed in different embodiments. Furthermore, the method could be implemented using several sub-methods, or as part of a larger macro method. Thus, one of ordinary skill in the art would understand that the invention is not to be limited by the foregoing illustrative details, but rather is to be defined by the appended claims.

I claim:

1. A method for developing personally fitting custom accessories comprising:

providing, by a source entity, a malleable medium to a personal user with instructions directing the personal user to manipulate the malleable medium into a perfect fit mold of a personally fitting custom accessory;

clinching a hand, by the personal user, around the malleable medium to form a hand grip mold that perfectly fits the hand of the personal user;

hardening the malleable medium of the hand grip mold that perfectly fits the hand of the personal user into a hardened personally fitting custom hand grip accessory;

providing, to the source entity by the personal user after the malleable material of the hand grip mold that perfectly fits the hand of the personal user is hardened, (i) the hardened personally fitting custom hand grip accessory and (ii) a description of a handle mounting block of a rifle to which the hardened personally fitting custom hand grip accessory attaches, wherein the handle mounting block comprises a mounting block hole;

digitally scanning the hardened personally fitting custom hand grip accessory, by the source entity, in three dimensions ("3D scan");

creating a digital personally fitting custom hand grip accessory three-dimensional ("3D") model of the personally fitting custom hand grip accessory based on the 3D scan;

modifying the digital personally fitting custom hand grip accessory 3D model, by the source entity through engineering software, based on the description of the handle mounting block of the rifle, wherein the modified digital personally fitting custom hand grip accessory 3D model comprises a hole of a size and shape sufficient to thread a bolt for mounting to the handle mounting block of the rifle;

physically creating, by a manufacturing device, a personally fitting custom hand grip accessory product based on the modified digital personally fitting custom hand grip accessory 3D model, wherein the personally fitting custom hand grip accessory product comprises (i) a hand grip that perfectly fits the hand of the personal user and (ii) a hand grip hole of the size and shape sufficient to thread the bolt, wherein the personally fitting custom hand grip accessory product is configured to attach to the handle mounting block of the rifle and securely mount to the handle mounting block by threading the bolt through the hand grip hole and screwing the bolt into the mounting block hole of the handle mounting block; and providing the personally fitting custom accessory product to the personal user.

2. The method for developing personally fitting custom accessories of claim 1, wherein digitally scanning the hardened personally fitting custom hand grip accessory comprises using a structured light scanner by the source entity to perform the 3D scan.

3. The method for developing personally fitting custom accessories of claim 1, wherein the personally fitting custom hand grip accessory comprises a rifle hand grip.

4. The method for developing personally fitting custom accessories of claim 3, wherein the hand grip mold that perfectly fits the hand of the personal user is formed so the hand grip perfectly fits contours of a grip hand of the personal user when wrapped around and clinching the hand grip.

5. The method for developing personally fitting custom accessories of claim 1, wherein hardening the malleable medium of the hand grip mold that perfectly fits the hand of the personal user comprises drying the malleable medium of the hand grip mold that perfectly fits the hand of the personal user, wherein the personal user protects the malleable medium of the hand grip mold while hardening to prevent deformation.

6. The method for developing personally fitting custom accessories of claim 5, wherein drying the malleable medium of the hand grip mold comprises one of air drying and heat drying.

7. The method for developing personally fitting custom accessories of claim 1, wherein providing the hardened personally fitting custom hand grip accessory to the source entity further comprises providing a description of any additional attachments the personal user requires for using the personally fitting custom hand grip accessory product when mounted to the rifle.

8. The method for developing personally fitting custom accessories of claim 7, wherein the personal user provides the description of a particular mount component to attach to the personally fitting custom hand grip accessory product to a particular rifle.

9. The method for developing personally fitting custom accessories of claim 1, wherein physically creating the personally fitting custom hand grip accessory product comprises using one of an additive manufacturing process and a subtractive manufacturing process.

10. The method for developing personally fitting custom accessories of claim 9, wherein the manufacturing device comprises a 3D printer.

11. The method for developing personally fitting custom accessories of claim 9, wherein the manufacturing device comprises a computer numerical control (CNC) machine.

* * * * *